United States Patent [19]
Bontrager

[11] Patent Number: 5,362,126
[45] Date of Patent: Nov. 8, 1994

[54] BICYCLE SADDLE

[76] Inventor: Keith D. Bontrager, 342 Morrissey Blvd., Santa Cruz, Calif. 95062

[21] Appl. No.: 912,831

[22] Filed: Jul. 13, 1992

[51] Int. Cl.$^5$ .............................................. B62J 1/00
[52] U.S. Cl. .................................... 297/195.1; D6/354
[58] Field of Search ............ 297/195, 214, 202, 195.1; D6/354

[56] References Cited

U.S. PATENT DOCUMENTS

| 574,503 | 1/1897 | Van Meter | 297/200 |
| 4,098,537 | 7/1978 | Jacobs | 297/195 |
| 4,099,796 | 7/1978 | Jacobs | 297/204 |
| 4,898,422 | 2/1990 | West, III | 297/202 |

FOREIGN PATENT DOCUMENTS

| 762461 | 4/1934 | France | 297/195 |
| 710400 | 6/1954 | United Kingdom | 297/195 |

OTHER PUBLICATIONS

"Bornemann Deluxe Saddle Cushions" A Trade Brochure From Bornemann Products Inc. 115 W. Plymouth St., Bremen, Indiana, Date unknown.

Primary Examiner—Alexander Grosz
Attorney, Agent, or Firm—Robert O. Guillot

[57] ABSTRACT

A bicycle saddle comprising a molded nylon saddle shell which includes a pair of metal support rails mated to mounts formed along the underside of the shell, dense foam padding material selectively arranged on a top surface of the shell, and cover material stretched over the padding material and secured to the underside of the shell. The saddle is further defined as having a narrow front portion which extends rearwardly to a broader mid-portion until about the last ½ to ⅓ portion of the rear saddle area where the sides of the saddle are trimmed down to eliminate the normally widely flared rear side portions associated with conventional racing saddles. The top surface contour of the saddle is substantially flat. The reduced surface area of the saddle afforded by the specially trimmed down side portions and flat back provide a greatly increased freedom of movement in getting on and off the saddle.

16 Claims, 1 Drawing Sheet

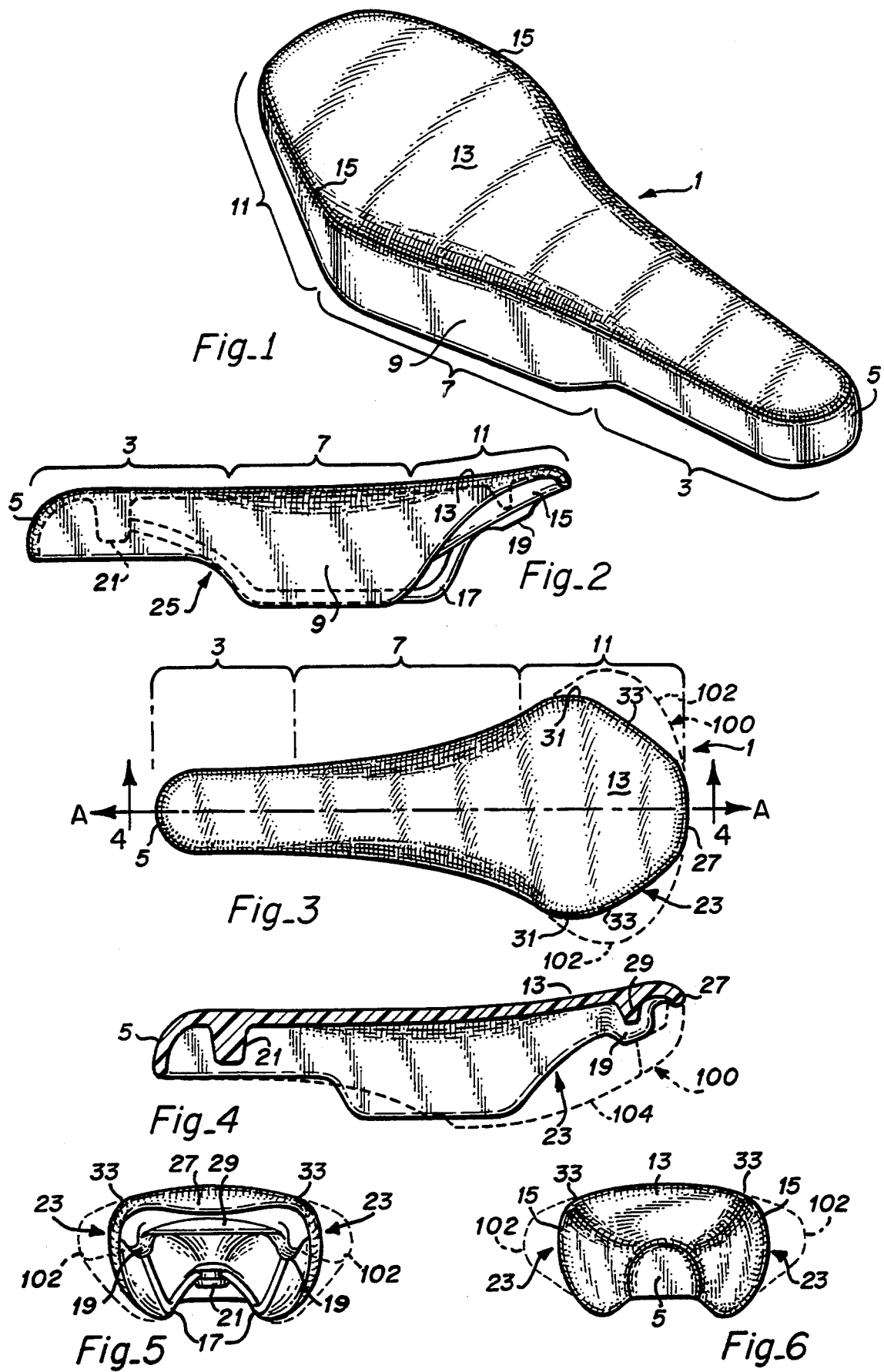

BICYCLE SADDLE

BACKGROUND OF THE INVENTION

1. Field of the Invention

The present invention relates generally to bicycle saddles and more particularly to a saddle that includes a reduced surface area, cut down sides and a substantially inwardly tapered rear portion.

2. Brief Description of the Prior Art

The basic design of the bicycle saddle has not changed significantly in over 100 years. The shape of modern performance oriented bicycle saddles are generally horizontal in profile with a narrow front end portion (the horn or pommel) and a wider, flared tail portion with a concave intermediate portion for inner thigh clearance while riding.

Most modern high performance saddles consist of a pliable or semi-rigid molded plastic or nylon shell over which a padded leather, plastic or vinyl cover is fitted. The use of these materials in modern saddles has resulted in a lighter, more durable and more appealing saddle than those of even ten years ago, but the seat contours have remained substantially the same.

The desired characteristics a good high performance or competitive saddle include minimal weight, stiffness, comfort, and a functional outer surface contour which aids in rider performance during competitive cycling. Specifically, all of these characteristics should be combined to form a saddle which affords the rider a degree of freedom of movement to quickly get on and off the saddle when necessary during a ride.

For example, in the sport of mountain biking, the rider must often negotiate a steep rugged decent on a rutted and rock strewn single track trail or fire road. In this situation, the rider must repetitively to get on and off the saddle to redistribute weight over the rear wheel to avoid a dangerous "endo" maneuver (i.e., where the center of gravity of the bike and the rider is skewed to a point where the bike and rider cartwheel end-over-end). Typical prior art performance saddles having a widely flared rear end portion do not have sufficient inner thigh clearance and inhibit the rider's ability to quickly slide off the back of the saddle.

Instead, the rider must first lift his or her pelvis upwardly off the saddle then backwardly in order to clear the widely flared rear portions of the saddle. When timing and balance are most critical, this upward and backward lift off motion during a difficult descent may quickly upset the rider/bike center of gravity forcing the rider to slow down abruptly to avoid crashing. Further, these prior art saddles will typically have their greatest width dimension (as viewed from above and looking down at the saddle seating surface) located substantially at rear terminal end of the saddle, thus resulting in a blunted rear end portion which makes for difficult transitions back onto the saddle from the rearward direction. Accordingly, the ideal mountain bike saddle should have a reduced width in the rear saddle portion for permitting inner thigh clearance when getting off the back of the saddle and should have a gradual and smooth taper in the width of the seating surface from the widest point of the rear saddle portion to the rear terminal end to permit smooth transition back on to the saddle.

Also, in competitive road cycling, a reduced and gradually tapered rear saddle width is also functionally desirable since it permits a racer to "throw" his or her bike across the finish line during a sprint (i.e., where the rider thrusts the handle bars of the bike forward and slides off the rear of the saddle at a critical instant to gain precious inches). A saddle having a widely flared upper seating surface will interfere with the inner thigh portions of the rider's leg during this "throwing" action, thus inhibiting the rider's ability to gain the additional inches necessary to win a close sprint finish.

The desired competitive saddle must also adequately support and distribute the load associated with the pressure points of the rider's lower pelvis region on the saddle surface to ensure rider comfort for prolonged periods of use. While most modern day saddle manufacturers take advantage of advances made in plastics, composites and metallurgy for designing a saddle which is both light weight and comfortable, compromises are usually made to one or more of the desired characteristics of the ideal performance saddle. Accordingly, a saddle which successfully combines all of the above desired characteristics is lacking in the art.

U.S. Pat. Nos. 4,098,537 and 4,099,796, both issued to Jacobs, disclose bicycle saddles which exhibit increased stiffness and resistance to flexure. The saddles include a nylon shell portion having an adjustable longitudinal tensioning rib incorporated within the underside of the shell for increasing the longitudinal stiffness of the saddle and a transverse rib extending across the saddle at the central transition portion to impart flexural stiffness to the saddle. The tensioning rib, while providing stiffness to the nylon shell portion adds an undesirable amount of weight to the saddle.

U.S. Pat. No. 574,503 (Van Meter, 1897) discloses a saddle having a surface contour design to distribute the pressure points of the rider's pelvis. The saddle surface contour includes two rearwardly disposed, bilaterally symmetrical concavities for receiving the ischial tuberosities, a centrally disposed grove for the perineum region and a raised cantle. The concavities are also padded by means of air sacks disposed between the metal frame of the saddle and the saddle cover. The rearwardly concavities, perineum groove, and raised cantle of this saddle are ill-positioned and dimension to afford the rider any enhanced comfort. The perineum groove is overly deep and long, extending needlessly far into the cantle to give any support. Advances in materials have largely obviated the need to provide such exaggerated seat surface grooves and contours. This saddle is also neither light weight nor suitable for competitive use.

A recent trend in the art has been the manufacture of extremely lightweight racing saddles which make extensive use of advances in materials technology to achieve a reduced overall weight. These saddles typically employ a lightweight perforated resin nylon base shell which is mated to a pair of titanium rails arranged along the underside shell (or base) surface in the conventional manner. The top surface of the nylon base shell is provided with dense foam padding and a leather covering stretched thereover and secured to the underside of the shell. A common problem with these and similar titanium rail, ultra light saddle designs is the tendency of the saddle rails to sag or bend after extensive use. This causes extreme discomfort to the rider as the hard contact points of the pelvic bones ride on the unnatural bowed upward bend of the saddle shell which is no longer held in a desired pelvic supporting position in view of the bent support rails. These ultra light weight saddles also do not hold up well under a rigorous riding environment such as encountered in mountain biking. Also these saddles, while aimed at the high performance market, do not contain a rear saddle region contour which permits the desired freedom of movement in getting on and off the saddle.

Accordingly, there is a definite need in the art for an improved lightweight, comfortable, stiff and functional competitive bicycle saddle which overcomes the problems of the prior art.

SUMMARY OF THE INVENTION

List of Objectives

It is therefore a principal objective of the present invention to provide a comfortable, lightweight high performance bicycle saddle having an outer surface contour specially designed for competitive cycling.

It is another object of the present invention to provide a saddle of the type described which includes a specially configured rear saddle portion having a reduced and gradually tapered rear saddle width and a substantially flat back.

It is another object of the invention to provide a saddle of the type described wherein a sufficient width dimension is maintained in the appropriate location of the rear saddle seating surface for support of the ischial tuberosities and adjacent bone structure of the rider's pelvis for adequate distribution of pressure points while still permitting the rider with adequate freedom of movement in getting on and off the saddle.

It is yet another object of the present invention to provide a saddle of the type described wherein the rear mounts for the support rails are located a distance inward of the rear end portion of the saddle sufficient to resist bending of the saddle rails and consequent upward bowing of the saddle shell.

Briefly, a preferred embodiment of the present invention comprises a molded nylon saddle shell having a pair of metal support rails mated to mounts formed along the underside of the shell, dense foam padding material selectively arranged on a top surface of the shell, and a leather, suede or like material stretched over the padding material and secured to the underside of the shell. The saddle is further defined as having a narrow front portion which extends rearwardly to a broader mid-portion in accordance with conventional racing saddle design until about the last ½ to ⅓ portion of the rear saddle area where the sides of the saddle are trimmed down to eliminate the normally widely flared rear side portions associated with conventional racing saddles. The top surface contour of the saddle is maintained substantially flat. In view of its reduced and gradually tapered width, the saddle shell, when mated to a pair of titanium rails, results in a saddle that is extremely light weight, weighing in at only 190 grams. The rear mounts for the support rails are located a distance inward of the rear end portion of the saddle sufficient to resist bending of the saddle rails and consequent upward bowing of the saddle shell.

List of Advantages

An important advantage of the present invention is the increased freedom of movement in getting on and off the saddle afforded by the reduced and gradually tapered width of the seating surface adjacent the rear saddle portion.

These and other objects and advantages of the present invention will no doubt become apparent to those skilled in the art from the following drawings, detailed description of the preferred embodiment and the appended claims.

IN THE DRAWING

FIG. 1 is a perspective view of the preferred embodiment of the present invention showing the top, right side and forward portions of the saddle.

FIG. 2 is a left side elevation view of the preferred embodiment.

FIG. 3 is a top view of the preferred embodiment shown overlaying a typical prior art racing saddle design (shown in phantom).

FIG. 4 is a cross-sectional view of the saddle shell (the saddle rails, padding and cover are omitted for clarity) taken along the line and in the direction of arrows 4—4 in FIG. 3 and is shown overlaying a typical prior art racing saddle design (shown in phantom).

FIG. 5 is a rear end view of the preferred embodiment shown overlaying a typical prior art racing saddle design (shown in phantom).

FIG. 6 is a front end view of the preferred embodiment shown overlaying a typical prior art racing saddle design (shown in phantom).

DETAILED DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

A bicycle saddle constructed in accordance with one embodiment of the present invention is shown in FIG. 1 and generally designated as numeral 1. The saddle 1 is preferably constructed in accordance with known manufacturing techniques in that it consists of an underlying molded plastic shell having a dense foam padding placed along the upper surface thereof and a cover material, preferably calf leather, stretched thereover and secured to the underside of the shell, preferably by adhesive bonding.

The underlying shell may be fabricated out of injection molded polypropylene, polyurethane, ABS copolymer or other like plastic material in a monocoque construction. The density and molecular weight of the selected plastic should be sufficiently high to provide a relatively rigid construction, yet permit some flexure at applied pressure points, yet should not be so flexible so as to promote fatigue, inefficiency or inadequate support.

The saddle 1 when constructed as above described comprises an elongated front end portion 3 having a pommel 5 disposed at a foremost end, a transitional mid-portion 7 defined by substantially flat sides 9, and a slightly flared outward rear portion 11. The rear portion 11 is defined as having a substantially flat upper surface 13 which curves sightly downwards symmetrically along each side edge terminating at vertically flat surfaces 15.

As is best seen in FIG. 2, the side profile of the saddle 1 includes a step region 25 disposed adjacent the juncture of the forward region 3 and the transitional midregion 7. A pair of support rails 17 (only one of which is visible in FIG. 2) are mounted to the underside of the saddle shell at rear mounts 19 and front mount 21. The rail mounts 19 and 21 are preferably molded directly to the saddle shell. Sides 9 of the mid-region 7 form a skirt sufficiently long to cover the support rails 17 to prevent the rider's inner thigh or riding shorts from coming into pinching contact with the bottom edge of the sides 9 and the rails 17.

Referring now to FIGS. 3–6, a comparison between the novel saddle 1 of the present invention and a typical prior art racing saddle design 100 (outline profile indicated in phantom) is shown. As is best seen in FIGS. 3, 5 and 6, the major distinction between the present invention and the conventional racing saddle design 100 of the prior art is the reduction in surface area in the rear saddle portion 11 of the present invention by elimination of the excess width at side portions 102 (shown in phantom). The trimmed side portions 23 are turned down flush with the vertically flat side surfaces 15.

As is best seen in the top view of FIG. 3, the functional contour features of the trimmed side portions 23 are shown. From a top view, each of the left and right side edge profiles of the saddle 1 is generally parallel to the longitudinal axis A—A of the saddle in the area of the front saddle portion 3 and begins to flare sightly outward (or bend away from the longitudinal axis A—A) in the area of the transitional saddle portion 7. At the rear saddle portion 11, each of the saddle side edge profiles (the left and right side edge profiles are symmetrical about axis A—A) includes a first forwardly disposed side edge profile region 31 and a second rearwardly disposed side edge profile region 33. The forward edge profile regions 31 define the juncture between the transitional saddle portion 7 and the rear saddle portion 11 and extend rearwardly to their coordinate rearward edge profile regions 33. Each forward side edge profile region 31 curves slightly inward and runs in a direction substantially parallel to the longitudinal axis A—A. Each rearward side edge profile region 33 tapers gradually inward (i.e., towards longitudinal axis A—A) and extends to the sightly arcuate terminal edge profile end portion 27. The side edge profile regions 31 and 33 of the trimmed side portions 23 are disposed to form a continuous surface with the generally vertical side flats 15 (see FIG. 1). As is evident in the drawings, the width (or height dimension when viewed in side profile) of flat side surfaces 15 has a maximum dimension in the area of overlap between side edge profile regions 31 and 33 and smoothly tapers to run flush with the saddle perimeter edge dimension in both forward and rearward directions.

In the preferred embodiment, the rear saddle portion 11 has a length of approximately ½ to ⅓ of the total length of the saddle 1. Also, the forward side edge profile regions 31 are approximately equal in length to the gradually inward tapered rearward side edge profile regions 33. The distance (across the saddle) between the forward side edge profiles 31 defines the maximum width of the saddle.

The smooth transitions between all the contour features of the rear saddle portion 11 and the resultant reduction in surface area achieved by the above described contour features of the trimmed side regions 23 in combination with the substantially vertical flat side surfaces 15 and the flat back of the upper surface 13 (as viewed in side profile of FIG. 4) give a rider a greatly increased freedom of movement in sliding off of and back on the rear saddle portion 11 of the saddle 1.

These saddle contour features substantially eliminate the prior art leg clearance problems associated with the outer side regions of the saddle and the rider's inner thigh, yet the usable width in the rear saddle portion 11 has been maintained to provide the necessary support to evenly distribute the load of the pressure points of the rider's lower pelvis region (pelvic protuberances) over the saddle. At its widest point, the preferred saddle 1 of the present invention measures in the range of about 4.4" to 4.6". However, it is understood that the invention is not limited to this range of preferred saddle widths and may include narrower or wider saddle designs which include appropriately and gradually tapered sides extending rearwardly to the rear terminal end of the saddle. For example, in view of the inherent anatomical difference between the pelvic bone structure of male and female riders, a women's version for the saddle of the present invention would typically have a slightly greater width dimension than the preferred upper range limit of 4.6" described above.

For comparison, most modern racing saddles have a widely flaring rear saddle portion which measures at about 5.5" or more at its widest point. A bulk of the outer perimeter surface area 104 (FIG. 4) and the side portions 102 (FIGS. 3, 5 and 6) of the prior art saddles are never used and do not contribute to the load distribution of the rider's pressure points. In other words, these side portions 102 are wasted space that do not contribute to the function of the saddle. Moreover, the wide point on most prior art saddles is typically located farther back towards the rear terminal end of the saddle (See FIG. 3), thus creating a hang up region for the rider's inner thighs when the rider attempts to move backwards to slide off the saddle. This wide point location for the prior art saddle also creates an undesirably abrupt or blunt re-entry point when the rider attempts to slide back onto the saddle.

FIG. 4 shows in cross-section the reduction of surface area of the saddle 1 along the side profile of the saddle as compared to the typical prior art racing saddle 100. As is evident from the drawing, the trimmed down side regions 23 shave off a considerable amount of excess saddle material 104 from the prior art design 100. This reduction of material translates into tremendous weight savings, and when the saddle shell of the present invention is mated to titanium support rails, the saddle weighs just 190 grams. Typical prior art racing saddles having steel rails weigh around 340–350 grams while those equipped with titanium rails weigh around 280 grams.

As is best seen in FIGS. 2 and 4, the rear rail mounts 19 are preferably positioned inward a distance from the rear terminal edge 27 of the rear saddle portion 11. This effectively shortens the rail length between the mounts 19 and 21 and helps to increase the resistance to bending when the rails are mounted to the seat clamp unit of the seat post (not shown). Alternatively, the rail mounts 19 may be positioned substantially at the rear terminal edge 27 as is conventional with prior art designs. A transverse rib member 29 bridges the two rear rail mounts 19 to provide additional support against flexure (see FIGS. 4 and 5).

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

What is claimed is:

1. A bicycle saddle for attachment to a seat post member comprising in operative combination:
   a) a generally narrow front end saddle portion including a pommel disposed at a leading end and a pair of spaced apart, opposed side surfaces and a top surface, said side surfaces and said top surface being disposed generally parallel with a longitudinal axis of said saddle;
   b) a transitional mid-saddle portion disposed aft of said front end saddle portion having a top surface and a pair of spaced apart, opposed sides surfaces and wherein:
      i) said mid-saddle portion top surface having a first forward end disposed flush with said front end portion top surface and a second rear end;
      ii) each of said mid-saddle portion side surfaces having a first forward end disposed flush with coordinate side surfaces of said front end saddle portion and a second rear end which flares outward in a direction away from said longitudinal axis;
   c) a rear saddle portion of a reduced surface area for providing a rider with increased freedom of movement when getting off and back on the saddle from a rearward direction, said rear saddle portion having a length in the range of approximately ½ to ⅓ of an overall length of the saddle and which includes:
      i) a substantially flat top surface having a forward end disposed flush with said top surface rear end of said transitional mid-saddle portion and a second rear terminal end;
      ii) a pair of specially contoured, spaced apart, opposed side edge profiles, each including a first forward side edge profile region and a second rearward side edge profile region and wherein a distance between said forward side edge profile regions defines a maximum width dimension of said saddle;
      iii) each of said first forward side edge profile regions of said specially contoured side portions extending from coordinate rear ends of said outward flaring side surfaces of said mid-saddle portion and are disposed substantially parallel with said longitudinal axis; and
      iv) said second rearward side edge profile regions of said specially contoured side portions extending from said first forward side regions to said terminal end and having a gradually inward taper in a direction towards said longitudinal axis
   d) and wherein said maximum width dimension of said saddle is approximately 4.6 inches.

2. A bicycle saddle as in claim 1 wherein said first and second side edge profile regions of said specially contoured side edge profiles smoothly taper to substantially vertically flat side surfaces.

3. A bicycle saddle as in claim 2 wherein said mid-saddle portion side surfaces have a height dimension sufficient to form a skirt for covering a support rail portion of said saddle to prevent pinching contact of a rider's inner thigh or clothing with said support rail.

4. A bicycle saddle as in claim 3 wherein the distance between said forward side regions is sufficiently wide to support the pelvic protuberances of a rider when seated thereon yet still permits inner thigh clearance to said rider when getting off the saddle in a rearward direction.

5. A bicycle saddle as in claim 4 wherein the length dimensions of said first forward side regions and said second rearward side regions of said rear saddle portion are substantially equal.

6. A bicycle saddle as in claim 1 wherein said mid-saddle portion side surfaces have a height dimension sufficient to form a skirt for covering a support rail portion of said saddle to prevent pinching contact of a rider's inner thigh or clothing with said support rail.

7. A bicycle saddle as in claim 1 wherein the distance between said forward side regions is sufficiently wide to support the pelvic protuberances of a rider when seated thereon yet still permits inner thigh clearance to said rider when getting off the saddle in a rearward direction.

8. A bicycle saddle as in claim 1 wherein the length dimensions of said first forward side regions and said second rearward side regions of said rear saddle portion are substantially equal.

9. A bicycle saddle as in claim 1 wherein said maximum width dimension of said saddle is within the range of from approximately 4.4 inches to approximately 4.6 inches.

10. A bicycle saddle as in claim 9 wherein said first and second side edge profile regions of said specially contoured side edge profiles smoothly taper to substantially vertically flat side surfaces.

11. A bicycle saddle as in claim 10 wherein said mid-saddle portion side surfaces have a height dimension sufficient to form a skirt for covering a support rail portion of said saddle to prevent pinching contact of a rider's inner thigh or clothing with said support rail.

12. A bicycle saddle as in claim 11 wherein the distance between said forward side regions is sufficiently wide to support the pelvic protuberances of a rider when seated thereon yet still permit inner thigh clearance to said rider when getting off the saddle in a rearward direction.

13. A bicycle saddle as in claim 12 wherein the length dimensions of said first forward side regions and said second rearward side regions of said rear saddle portion are substantially equal.

14. A bicycle saddle as in claim 9 wherein said mid-saddle portion side surfaces have a height dimension sufficient to form a skirt for covering a support rail portion of said saddle to prevent pinching contact of a rider's inner thigh or clothing with said support rail.

15. A bicycle saddle as in claim 9 wherein the distance between said forward side regions is sufficiently wide to support the pelvic protuberances of a rider when seated thereon yet still permits inner thigh clearance to said rider when getting off the saddle in a rearward direction.

16. A bicycle saddle as in claim 9 wherein the length dimensions of said first forward side regions and said second rearward side regions of said rear saddle portion are substantially equal.

* * * * *